US009906371B2

(12) United States Patent
Ashley et al.

(10) Patent No.: US 9,906,371 B2
(45) Date of Patent: *Feb. 27, 2018

(54) SECURE CONNECTION CERTIFICATE VERIFICATION

(71) Applicant: International Business Machines Corporation, Armonk, NY (US)

(72) Inventors: Paul A. Ashley, Toowong (AU); Carsten Hagemann, Ashmore (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,998

(22) Filed: Feb. 18, 2016

(65) Prior Publication Data

US 2016/0164685 A1 Jun. 9, 2016

Related U.S. Application Data

(63) Continuation of application No. 14/728,092, filed on Jun. 2, 2015, which is a continuation of application No. 14/464,731, filed on Aug. 21, 2014, now Pat. No. 9,300,656.

(51) Int. Cl.
*H04L 9/00* (2006.01)
*H04L 9/32* (2006.01)
*H04L 29/06* (2006.01)

(52) U.S. Cl.
CPC ........ *H04L 9/3263* (2013.01); *H04L 63/0428* (2013.01); *H04L 63/0823* (2013.01); *H04L 63/0876* (2013.01); *H04L 63/166* (2013.01); *H04L 63/20* (2013.01); *H04L 2209/24* (2013.01); *H04L 2209/64* (2013.01)

(58) Field of Classification Search
CPC . H04L 63/0823; H04L 63/0869; H04L 63/12; H04L 63/0807; H04L 63/20
USPC ................... 726/1–4, 10; 713/150, 155–156, 713/160–161, 168–170, 173
See application file for complete search history.

(56) References Cited

U.S. PATENT DOCUMENTS

| 6,807,577 | B1 | 10/2004 | Gillespie et al. |
| 6,854,056 | B1 | 2/2005 | Benantar et al. |
| 7,130,999 | B2 * | 10/2006 | Yasala ................. H04L 63/0823 713/157 |
| 7,395,424 | B2 | 7/2008 | Ashley et al. |
| 7,418,597 | B2 | 8/2008 | Thornton et al. |

(Continued)

OTHER PUBLICATIONS

Evans, et al., "Public Key Pinning Extension for HTTP draft-ieff-websec-key-pinning-13", Copyright (c) 2014 IETF Trust, Last Updated May 13, 2014, <https://datatracker.ieff.org/doc/draft-ieff-websec-key-pinning/?include_text=1>.
Soghoian, et al., "Certified Lies: Detecting and Defeating Government Interception Attacks Against SSL*", CertLock, p. 1-18, <http://files.cloudprivacy.net/ssl-mitm.pdf>.
Vallentin, Matthias, "Should You Trust Your SSL Certificate?", downloaded May 16, 2014, p. 1-3, <http://matthias.vallentin.net/blog/2010/03/should-you-trust-your-ssl-certificate/>.

(Continued)

*Primary Examiner* — Hosuk Song
(74) *Attorney, Agent, or Firm* — Christopher McLane; Isaac J. Gooshaw

(57) ABSTRACT

One or more computer processors identify a first certificate that is used to establish a secure Internet connection. One or more computer processors identify a stored second certificate that shares at least one attribute with the first certificate. One or more computer processors determine a policy action based, at least in part, on a result of a comparison between an attribute of the first certificate and an attribute of the second certificate.

20 Claims, 3 Drawing Sheets

(56) References Cited

U.S. PATENT DOCUMENTS

| | | | |
|---|---|---|---|
| 7,647,501 B2 * | 1/2010 | Imai | G06F 21/33 380/277 |
| 7,694,333 B2 | 4/2010 | Imai | |
| 7,802,099 B2 * | 9/2010 | Mitchell | H04L 63/06 713/156 |
| 7,996,886 B1 | 8/2011 | Hughes et al. | |
| 8,005,969 B2 | 8/2011 | Miyazawa et al. | |
| 8,185,945 B1 * | 5/2012 | Eatough | H04L 63/0823 709/203 |
| 8,793,487 B2 * | 7/2014 | Epstein | H04L 9/006 713/155 |
| 9,094,413 B2 | 7/2015 | Tuch et al. | |
| 9,253,193 B2 | 2/2016 | Udupa et al. | |
| 9,300,656 B2 * | 3/2016 | Ashley | H04L 63/0823 |
| 9,455,958 B1 | 9/2016 | Walter et al. | |
| 2009/0037997 A1 | 2/2009 | Agbabian et al. | |
| 2010/0083347 A1 | 4/2010 | Hinton | |
| 2011/0219442 A1 | 9/2011 | Brabson et al. | |
| 2015/0128205 A1 | 5/2015 | Mahaffey et al. | |

OTHER PUBLICATIONS

Wisniewski, Chester, "SSL certificate safety bolstered by standards that lessen dependence on CAs", Jun. 1, 2012, Naked Security, <http://nakedsecurity.sophos.com/2012/06/01/ssl-certificate-safety-bolstered-by-standards-that-lessen-dependence-on-cas/>.

"Certificate Patrol—a psyced Firefox/Mozilla add-on", downloaded May 16, 2014, p. 1-9, <http://patrol.psyced.org/>.

"Turkish Registrar Enabled Phishers to Spoof oogle", Krebs on Security, Jan. 2013, p. 1-14, <http://krebsonsecurity.com/2013/01/trukish-registrar-enabled-phishers-to-spoof-google/>.

List of IBM Patents or Patent Applications Treated as Related, May 27, 2015.

Ashley et al., "Secure Connection Certificate Verification", U.S. Appl. No. 14/464,731, filed Aug. 21, 2014, 29 pages.

Ashley et al., "Secure Connection Certificate Verification", U.S. Appl. No. 14/728,092, filed Jun. 2, 2015, 25 pages.

Appendix P, List of IBM Patents or Patent Applications Treated as Related, 2 pages, dated Feb. 23, 2016.

* cited by examiner

SECURE CONNECTION CERTIFICATE VERIFICATION

BACKGROUND OF THE INVENTION

The present invention relates generally to secure socket layer connections, and more particularly to a review of certificates.

Transport Layer Security (TLS) and its predecessor, Secure Sockets Layer (SSL), are cryptographic protocols designed to provide communication security over the Internet. The term SSL often refers to different variations of TLS and SSL. SSL uses certificates and asymmetric cryptography to authenticate the counterparty and to exchange a symmetric key public or private session key. Data flowing between the parties is encrypted with a session key, which promotes data and message confidentiality. Additionally, the session key allows for message authentication codes for message integrity and as a by-product, message authentication. Several versions of the protocols are in widespread use in applications such as web browsing, electronic mail, Internet faxing, instant messaging, and voice-over-Internet-protocol (VoIP). A property in a SSL context is forward secrecy, so the short-term session key cannot be derived from the long-term asymmetric secret key.

SUMMARY

Embodiments of the present invention disclose a method, computer program product, and system for determining a policy action for a connection in which certificates are utilized in a secure network connection on one or more computing devices. One or more computer processors identify a first certificate that is used to establish a secure Internet connection. One or more computer processors identify a stored second certificate that shares at least one attribute with the first certificate. One or more computer processors determine a policy action based, at least in part, on a result of a comparison between an attribute of the first certificate and an attribute of the stored second certificate. In one embodiment, the method further includes executing the determined policy action on a client computing device.

DETAILED DESCRIPTION

Secure Sockets Layers (SSL) are cryptographic protocols or encryption protocols used to provide secure connections over the Internet, and SSL, as used herein, refers to all protocols used to secure Internet connections, such as transport layer security (TLS). SSL utilizes X.509 certificates, certificate authorities, and a public key infrastructure to verify the relation between a certificate and its owner, as well as to generate, sign, and administer the validity of certificates. While certificate authorities are, in some scenarios, more beneficial than verifying the identities via a web of trust, embodiments of the invention recognize that certificate authorities are a weak point from a security standpoint, allowing man-in-the-middle attacks (MITM).

Implementation of embodiments of the invention may take a variety of forms, and exemplary implementation details are discussed subsequently with reference to the Figures.

Figure 1:
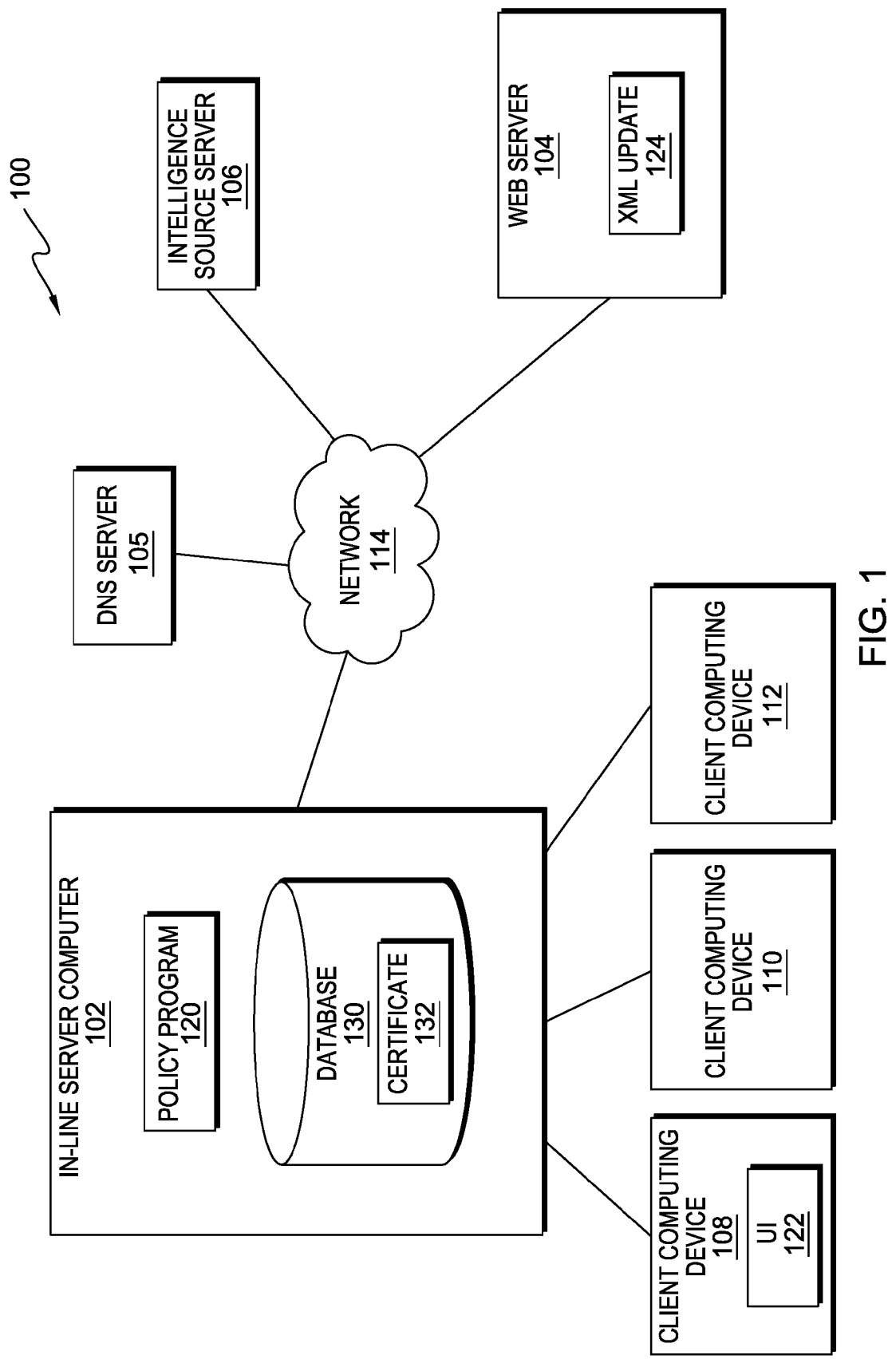
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes in-line server computer 102, client computing devices 108, 110, and 112, web server 104, domain name system (DNS) server 105, and intelligence source server 106, all interconnected over network 114. Network 114 represents, for example, a telecommunications network, a local area network (LAN), a wide area network (WAN), such as the Internet, or a combination of the three, and includes wired, wireless, and/or fiber optic connections. Network 114 includes one or more wired and/or wireless networks that are capable of receiving and transmitting data, voice, and/or video signals, including multimedia signals that include voice, data, and video information.

In the depicted environment, in-line server computer 102 is one or more of a management server, a web server, or any other electronic device or computing system capable of receiving and sending data. In this embodiment, in-line server computer 102 is an in-line server which oversees contacts between client devices and outside devices as opposed to a proxy server which acts as an intermediary for requests from clients seeking resources from other servers or computers. In an example, in-line server computer 102 is a next generation intrusion prevention system or a next generation firewall. In other embodiments, in-line server computer 102 represents a server computing system utilizing multiple computers as a server system, such as in a cloud computing environment. In another embodiment, in-line server computer 102 represents a laptop computer, a tablet computer, a netbook computer, a personal computer (PC), a desktop computer, a personal digital assistant (PDA), a smart phone, or any programmable electronic device capable of communicating with client computing device 108, 110, 112, web server 104, DNS server 105, and intelligence source server 106 via network 114. In another embodiment, in-line server computer 102 represents a computing system utilizing clustered computers and components to act as a single pool of seamless resources. In an embodiment, in-line server computer 102 is used to identify certificates, determine policy, and regulate interactions between the client computers of an enterprise (e.g., client computing device 108, 110, 112) and web server 104, via network 114. In-line server computer 102 includes policy program 120 and database 130.

In the depicted embodiment, database 130 resides on in-line server computer 102 and contains certificate 132. In another embodiment, database 130 resides elsewhere in distributed data processing environment 100. A database is an organized collection of data. Database 130 is implemented with any type of storage device capable of storing data that is accessed and utilized by in-line server computer 102, intelligence source server 106, web server 104, DNS server 105, and client computing devices 108, 110 and 112, such as a database server, a hard disk drive, or a flash memory. In other embodiments, database 130 represents multiple storage devices within in-line server computer 102. Database 130 stores certificates, such as certificate 132, which are secure socket layer (SSL) certificates that correspond to possible certificates from web servers, such as web server 104. Database 130 stores certificates from multiple web servers and intelligence sources for later comparison with a certificate utilized in an SSL connection.

In the depicted embodiment, database 130 stores certificates from past SSL connections. Database 130 also receives a certificate update, such as XML update 124, from web server 104 and stores the updated certificates in database 130 to be referenced by policy program 120. In one example, this connection is secure. In another embodiment, policy program 120 also accesses database 130 to send and receive certificates to and from an outside certificate source such as intelligence source server 106. In one embodiment, database 130 is updated directly by a cloud-based intelligence source, such as through frequent updates with a local database or in real time calling out to the cloud via an API (application programing interface) to retrieve data for a particular domain.

In depicted distributed data processing environment 100, policy program 120 resides on in-line server computer 102 and identifies and reviews certificates to determine a policy for a SSL connection. In one embodiment, policy program 120 receives updated and/or new certificates and stores the updated and/or new certificates in database 130. In another embodiment, policy program 120 identifies the certificate that was utilized to establish the SSL connection and stores the certificate in database 130. In an embodiment, policy program 120 identifies certificates with the same domain name or uniform resource locator (URL) and determines if the attributes of the certificates match by comparing the content of the attributes. In another embodiment, policy program 120 determines the policy to implement based upon the certificate utilized for the purposes of the SSL connection and any certificates that are similar to the utilized certificate. In an embodiment, policy program 120 enforces actions based on the determined policy and the corresponding predetermined user settings. Policy program 120 is depicted and described in further detail with respect to FIG. 2.

In the depicted embodiment, client computing devices 108, 110, and 112 are each one or more of a desktop computer, a laptop computer, a tablet computer, a specialized computer server, a smart phone, or any programmable electronic device capable of communicating with in-line server computer 102 via network 114 and with various components and devices within distributed data processing environment 100. In general, client computing devices 108, 110, and 112 each represent any programmable electronic device or combination of programmable electronic devices capable of executing machine readable program instructions and communicating with other computing devices via a network, such as network 114. In one embodiment, client computing devices 108, 110, and 112 are connected to network 114 via in-line server computer 102. In another embodiment, client computing devices 108, 110, and 112 are connected directly to network 114, but in-line server computer 102 still has access to client computing devices 108, 110, and 112 and can implement policy and oversee connections to other computing devices.

User interface 122 is a program that provides an interface between a user of client computing device 108 and a plurality of applications (not shown) that reside on client computing device 108. A user interface, such as user interface 122, refers to the information (such as graphic, text, and sound) that a program presents to a user and the control sequences the user employs to control the program. There are many known types of user interfaces. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements.

In the depicted environment, intelligence source server 106 is one or more of a management server, a web server, or any other electronic device or computing system capable of receiving and sending data. In other embodiments, intelligence source server 106 represents a server computing system utilizing multiple computers as a server system, such as in a cloud computing environment. In another embodiment, intelligence source server 106 represents one or more of a laptop computer, a tablet computer, a netbook computer, a personal computer (PC), a desktop computer, a personal digital assistant (PDA), a smart phone, or any programmable electronic device capable of communicating with client computing device 108, 110, and 112, in-line server computer 102, DNS server 105, and web server 104, via network 114 In another embodiment, intelligence source server 106 represents a computing system utilizing clustered computers and components to act as a single pool of seamless resources. Intelligence source server 106 communicates with policy program 120, and database 130, located on in-line server computer 102, to provide updated certificates and information regarding attributes of certificates. Intelligence source server 106 also receives information from in-line server computer 102 regarding new and/or updated certificates or new and/or updated attributes of certificates.

In depicted distributed data processing environment 100, domain name system (DNS) server 105 represents one or more of a management server, a web server, or any other electronic device or computing system capable of receiving and sending data. In other embodiments, DNS server 105 represents a server computing system utilizing multiple computers as a server system, such as in a cloud computing environment. In another embodiment, DNS server 105 represents one or more of a laptop computer, a tablet computer, a netbook computer, a personal computer (PC), a desktop computer, a personal digital assistant (PDA), a smart phone, or any programmable electronic device capable of communicating with client computing device 108, 110, 112, intelligence source server 106, web server 104, and in-line server computer 102, via network 114. In another embodiment, DNS server 105 represents a computing system utilizing clustered computers and components to act as a single pool of seamless resources. In an embodiment, DNS server 105 is a hierarchical distributed naming system for computing devices connected to the Internet. To further the embodiment, DNS server 105 translates domain names (which are easily memorized by users) into the numerical Internet protocol (IP) address needed for locating computer services and devices.

In depicted distributed data processing environment 100, web server 104 represents one or more of a management server, a web server, or any other electronic device or computing system capable of receiving and sending data. In other embodiments, web server 104 represents a server computing system utilizing multiple computers as a server system, such as in a cloud computing environment. In another embodiment, web server 104 represents one or more of a laptop computer, a tablet computer, a netbook computer, a personal computer (PC), a desktop computer, a personal digital assistant (PDA), a smart phone, or any programmable electronic device capable of communicating with client computing device 108, 110, 112, intelligence source server 106, DNS server 105, and in-line server computer 102, via network 114. In another embodiment, web server 104 represents a computing system utilizing clustered computers and components to act as a single pool of seamless resources. In an embodiment, web server 104 communicates with a client computing device (e.g., client computing device 108) and provides a certificate from a Certified Authority for the SSL connection.

In depicted distributed data processing environment 100, extensible markup language (XML) update 124 resides on web server 104. In one embodiment, XML update 124 contains information regarding certificates and keys. In various embodiments, web server 104 sends XML update 124 to either or both of intelligence source server 106 and database 130. In an embodiment, XML update 124 is a file that database 130 receives from the domain through a trusted channel. In an example, a disc containing a XML formatted file is received from a business partner with whom this enterprise will interact. In another embodiment, XML update 124 may be any other update known in the art.

Figure 2:
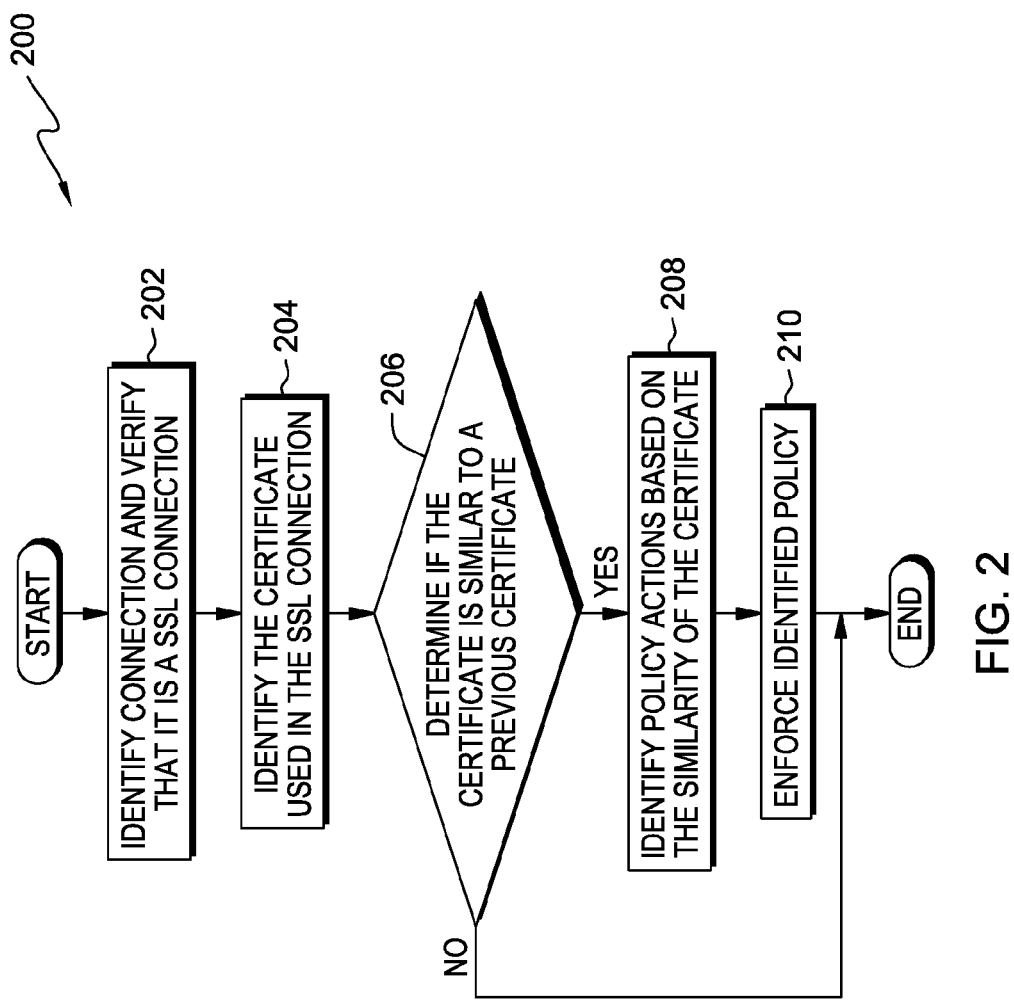
FIG. 2 is a flowchart depicting operational steps of a program for operating on an in-line server computer to determine a policy for a SSL connection within the distributed data processing environment of FIG. 1, in accordance with an embodiment of the present invention.

FIG. 2 is a flowchart depicting operational steps of policy program 120, in accordance with an embodiment of the present invention. Policy program 120 operates on in-line server computer 102 to identify certificates to determine a policy for a SSL connection. Policy program 120 also reviews certificates to determine a policy for a SSL connection. In one embodiment, policy program 120 initiates in response to in-line server computer 102 receiving a certificate from another computing device (e.g., web server 104), such as during an SSL connection between a client computer under an in-line server and another computer or server not under the in-line server. In another embodiment, policy program 120 monitors connections between a computing device (e.g., client computing device 108) and another computing device (e.g., web server 104). In yet another embodiment, policy program 120 begins the steps of FIG. 2 in response to a request of a user. For example, the user requests to monitor the connection between one computing device and another computing device. In an embodiment, policy program 120 begins the steps of FIG. 2 in response to database 130 storing an update (e.g., XML update 124) or a new and/or updated certificate.

Policy program 120 identifies a network connection and verifies that it is a SSL connection (step 202). In one embodiment, policy program 120 monitors network connections between a client computing device, such as client computing device 108 and computing device not under in-line server computer 102, such as web server 104. Policy program 120 identifies a SSL connection between a client computing device, such as client computing device 108 and another computing device, such as web server 104. In an example, a user of client computing device 108 requests a webpage provided by web server 104. In this example, a connection is established between client computing device 108 and web server 104. Policy program 120 identifies the connection and determines that the connection is a SSL connection. In this example, policy program 120 determines the connection is a SSL connection by identifying that a certificate has been utilized to establish the connection. In another embodiment, policy program 120 identifies all connections but does not verify that there is a SSL connection. In such an embodiment, policy program 120 proceeds to identify a certificate used in the connection (see step 204), and, if there is no certificate, policy program 120 aborts operations for that connection. In another embodiment, policy program 120 identifies a SSL connection during a server-to-server communication.

Policy program 120 identifies the certificate used in a SSL connection (step 204). In one embodiment, policy program 120 identifies the certificate, such as certificate 132, which was utilized to establish the SSL connection. In this embodiment, certificate 132 was provided to a client computing device (e.g., client computing device 108) by web server 104 to establish the SSL connection between the two devices. In-line server computer 102 identifies the certificate, such as certificate 132, which has been provided by web server 104 to establish the SSL connection to the webpage, web browser, or web server. In this embodiment, policy program 120 waits for a SSL connection to be established and the completion of a SSL connection establishment protocol before policy program 120 identifies the certificate utilized. In another embodiment, policy program 120 identifies the certificate before the establishment protocol is complete but waits until the establishment protocol is complete before proceeding with the next step. The establishment protocol includes certification that the domain name in the URL matches the name of the domain in the certificate, the certificate is signed by a trusted certified authority (CA) or trusted intermediate CA, and that the web server (e.g., web server 104) has access to the private key that matches the public key in the certificate. In another embodiment, the establishment protocol includes any other known protocol in the art. Once the SSL connection is established, policy program 120 proceeds to the next step. In one example, the establishment protocol for a SSL connection are not completed, and the connection is terminated.

In an embodiment, policy program 120 uses deep-packet inspection capabilities to capture the certificate that is utilized during the SSL connection. Deep-packet inspection is a form of computer network packet filtering that examines the data part and/or the header of a packet as the data passes an inspection point. Deep-packet inspection comprises searching for protocol non-compliance, viruses, spam, intrusions, and/or defined criteria to decide whether the packet may pass or if the packet needs to be routed to a different destination for the purpose of collecting statistical information. The captured certificate is stored in a database, such as database 130. In another embodiment, policy program 120 uses any method of capturing a certificate known in the art.

Policy program 120 determines if the certificate is similar to a previous certificate (decision 206). In the depicted embodiment, policy program 120 searches database 130 for similar previous certificates, which takes place in real time or at any time after the SSL connection has been established. In the depicted embodiment, the previous certificates that policy program 120 searches for similarity are one or more of certificates that have been previously captured by policy program 120, updates to certificates (e.g., XML update 124)

that have been received from browsers or web servers, a trusted intelligence source (e.g., intelligence source server 106), or any other trusted source that has access to database 130. In another embodiment, policy program 120 searches a trusted remote certificate source. In an example, this search is implemented if a local database is not used or as an additional location to search for a similar certificate.

By waiting for the SSL connection to be established, a man-in-the-middle attack is prevented. In an example in which the SSL connection is not established, an attacker creates a legitimate certificate for a webpage, redirects the victim's traffic from the intended webpage to a second webpage, and the second webpage delivers the certificate for the first webpage. By waiting for the SSL connection to be established before comparing certificates, redirect attacks or intercept traffic, such as DNS cache poisoning and man-in-the-middle attacks are detected. In an example, before a connection is trying to establish, the client computing device 108 asks the DNS server 105 for the IP address where the domain is hosted. Once the client computing device 108 has received that IP address, client computing device 108 tries to establish a connection to the received IP address. So, when the client is waiting for the SSL connection to be established, the IP address can't change.

Policy program 120 determines the similarities of the current certificate (e.g., certificate 132) as compared to a previous certificate by comparing multiple attributes from the previously stored certificates to those of the current certificate. In an example, policy program 120 searches for relevant certificates for comparison by searching for a common name attribute of the certificate, which contains the domain or subdomain. If the common name matches, then the certificate is identified as similar. In another example, policy program 120 determines that two certificates are similar if the CA serial number attribute of each certificate matches. In yet another embodiment, the search is more in depth and searches multiple attributes of a certificate to determine the similarity. In an example of searching multiple attributes, if 75 percent or more of the attributes from the previously stored certificate matches that of the current certificate, policy program 120 identifies the certificates as similar. In another embodiment, a user can set the threshold for similarity. In one embodiment, policy program 120 uses alterative search techniques as would be known and understood to one skilled in the art.

Policy program 120 compares identified similar certificates with the certificate from the current SSL connection. In the depicted embodiment, policy program 120 compares certificate 132 with other located certificates in database 130. The attributes of certificate 132 are checked against previous certificates. In one example, each type of attribute has to match exactly for the attribute to be deemed the same. In another example, if the attribute is within a user preset threshold, such as 95 percent similar, the attribute would be deemed to match. Attributes of a certificate comprise: the version, the serial number, the algorithm ID, the issuer (which contains the name of the CA, the organization, the location, the state, the country), the validity, the subject (which contains many personal details, such as the common name), the subject public key information including public key algorithm and subject public key, the issuer unique identifier, the subject unique identifier, the extensions, the signature algorithm, and the certificate signature. In an embodiment, in an instance when policy program 120 finds no similar certificates to certificate 132, policy program 120 goes to end (decision 206, NO branch). In another instance, policy program 120 will continue to the next step but with no identified similar attributes.

If policy program 120 determines that the certificate is similar to a previous certificate (decision 206, YES branch), then policy program 120 identifies policy actions based on the similarity of the certificates (step 208). In the depicted embodiment, policy program 120 identifies a policy action for certificate 132 based upon the similarity of attributes of a previously stored certificate. In an embodiment, policy actions are preset by the user. The policy actions are preset by a user of the client device, such as client computing device 108, and are based upon which attributes match between the current certificate being utilized to establish the SSL connection (e.g., certificate 132) and a previously stored certificate in a local storage (e.g., database 130), a certificate stored in another non-depicted database, or a trusted source (e.g., intelligence source server 106). In an example, the user accesses policy program 120 and preselects from a list of certificate attributes to determine policy actions for policy program 120 to implement. In another example, in-line server computer 102 stores, for each client device, policy actions that are based on the risk aversion deemed appropriate by a user of the client device. In one embodiment, the preset policy actions are stored in database 130. In another embodiment, the preset policy actions are stored on the client device. In another embodiment, policy program 120 queries the client device (e.g., client computing device 108) to determine the policy actions based upon the attributes of the certificate.

Some examples of policy actions include allow, block, or alert. These policy actions are triggered by policy program 120 comparing each of the attributes, or combinations of the attributes, of the current certificate to a similar certificate. In an example, if the country of the CA for certificate 132 does not match the country for the CA for the previously stored similar certificate, based upon the policy, action for policy program 120 is to block the connection. In another example, the certificate signature algorithm for certificate 132 has changed from a previously stored similar certificate, and the policy action for policy program 120 is to alert the user.

In one embodiment, policy program 120 sends a certificate to an outside source for analysis. In an example, policy program 120 does not find a previously stored certificate that is similar to certificate 132, and, in response, sends certificate 132 to intelligence source server 106. Intelligence source server 106 is an outside trusted source that reviews the certificate to determine the authenticity and sends back a recommendation, or a list of similarities and differences in attributes regarding the certificate utilized for the SSL connection, and a certificate in the trusted source for policy program 120 to determine which policy action to proceed with. In another example, if no similar certificate is located to certificate 132, policy program 120 prompts the user to determine if certificate 132 should be sent to intelligence source server 106. In one embodiment, a certificate (e.g., certificate 132) sent by policy program 120 is compared to certificates stored in a database located on intelligence source server 106 to determine if there is an exact match, in which case certificate 132 would be verified as a valid certificate.

Policy program 120 enforces an identified policy (step 210). In the depicted embodiment, policy program 120 enforces the identified policy for certificate 132 on a client computing device, such as client computing device 108. In an example, policy program 120 allows the SSL connection to continue between client computing device and web server 104 but sends an alert to the user of client computing device 108 because no similar certificates to certificate 132 have been located. This action is taken because the presets for client computing device 108 indicate that there should only be an alert sent if no similar certificates are located. Various examples of alerts comprise visual (e.g., popups), tactile (e.g., vibrations), and/or sound (e.g., alarm).

Figure 3:
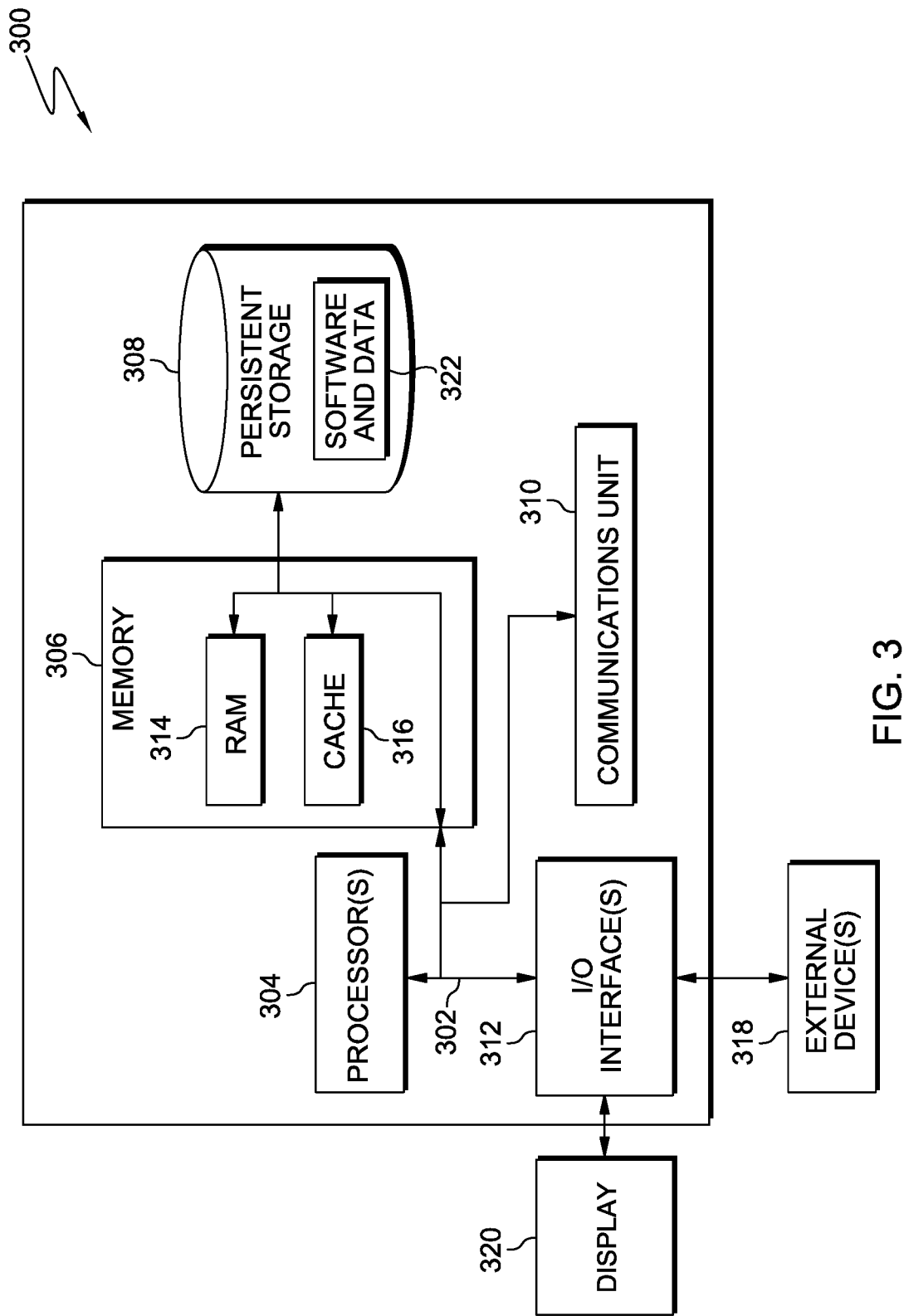
FIG. 3 depicts a block diagram of components of an in-line server computer, an intelligence source server, a web server, and client devices of FIG. 1, in accordance with an embodiment of the present invention.

FIG. 3 depicts a block diagram of components of computer 300, which is representative of in-line server computer 102, intelligence source server 106, client computing devices 108, 110, 112, and web server 104, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media. Software and data 322 are stored in persistent storage 308 for access and/or execution by processor(s) 304 via one or more memories of memory 306. With respect to in-line server computer 102, software and data 322 represents policy program 120 and database 130.

In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface(s) 312 may provide a connection to external device(s) 318 such as a keyboard, a keypad, a touch screen, and/or some other suitable input device. External device(s) 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a policy action for a connection in which certificates are utilized in a secure network connection, the method comprising:

identifying, by one or more computer processors, a first certificate that is used to establish a secure Internet connection;

identifying, by one or more computer processors, a stored second certificate that shares at least one attribute with the first certificate, wherein the stored second certificate was received during the establishment of a previous secure Internet connection;

determining, by one or more computer processors, a policy action based, at least in part, on a result of a comparison between an attribute of the first certificate and an attribute of the stored second certificate; and executing, by one or more computer processors, the policy action based, at least in part, on comparison of the attribute of the first certificate and the of attribute of the second certificate.

2. The method of claim 1, further comprising:

executing, by one or more computer processors, the determined policy action on a client computing device.

3. The method of claim 1, wherein identifying a first certificate that is used to establish a secure Internet connection comprises:

identifying, by one or more computer processors, a certificate that is utilized to establish a secure Internet connection via deep-packet inspection; and storing, by one or more computer processors, the identified certificate in a storage device.

4. The method of claim 1, wherein the secure Internet connection is one or both of a cryptographic protocol, or an encryption protocol, wherein the one or both of the cryptographic protocol, or the encryption protocol, is one or more of a secure socket layer connection, or a transport layer security.

5. The method of claim 1, wherein the stored second certificate is located in a database that is at least in part managed by an in-line computing device.

6. The method of claim 1, wherein determining the policy action occurs after the secure Internet connection has been established.

7. The method of claim 1, wherein determining, by one or more computer processors, a policy action based, at least in part, on a result of a comparison between an attribute of the first certificate and an attribute of the stored second certificate comprises:

determining, by one or more computer processors, that a type of attribute of the first certificate includes content that is different than a content of a same type of attribute of the second certificate; and executing, by one or more computer processors, the policy action based, at least in part, on a difference in the content of the type of attribute of the first certificate and the content of the same type of attribute of the second certificate.

8. A computer program product for determining a policy action for a connection in which certificates are utilized in a secure network connection, the computer program product comprising:

one or more computer readable storage device and program instructions stored on the one or more computer readable storage device, the program instructions comprising:

program instructions stored on the computer readable storage media for execution by at least one of the one or more computer processors, the program instructions comprising:

program instructions to identify a first certificate that is used to establish a secure Internet connection;

program instructions to identify a stored second certificate that shares at least one attribute with the first certificate and;

program instructions to determine a policy action based, at least in part, on a result of a comparison between an attribute of the first certificate and an attribute of the stored second certificate, wherein the result of the comparison includes a determination that a type of attribute of the first certificate includes content that is different than a content of a same type of attribute of the second certificate.

9. The computer program product of claim 8, further comprising program instructions to execute the determined policy action on a client computing device.

10. The computer program product of claim 8, wherein the program instructions to identify a first certificate that is used to establish a secure Internet connection, comprise program instructions to:

identify a certificate that is utilized to establish a secure Internet connection via deep-packet inspection; and storing the identified certificate in a storage device.

11. The computer program product of claim 8, wherein the secure Internet connection is one or both of a cryptographic protocol, or an encryption protocol, wherein the one or both of the cryptographic protocol, or the encryption protocol, is one or more of a secure socket layer connection, or a transport layer security.

12. The computer program product of claim 8, wherein the stored second certificate is located in a database that is at least in part managed by an in-line computing device.

13. The computer program product of claim 8, wherein determining the policy action occurs after the secure Internet connection has been established.

14. The computer program product of claim 8, wherein determining a policy action based, at least in part, on a result of a comparison between an attribute of the first certificate and an attribute of the stored second certificate, comprise program instructions to:

determine that a type of attribute of the first certificate includes content that is different than a content of a same type of attribute of the second certificate; and execute the policy action based, at least in part, on a difference in the content of the type of attribute of the first certificate and the content of the same type of attribute of the second certificate.

15. A computer system for determining a policy action for a connection in which certificates are utilized in a secure network connection, the computer system comprising:

one or more computer processors;

one or more computer readable storage media device;

program instructions stored on the computer readable storage media for execution by at least one of the one or more computer processors, the program instructions comprising:

program instructions to identify a first certificate that is used to establish a secure Internet connection;

program instructions to identify a stored second certificate that shares at least one attribute with the first certificate; and program instructions to determine a policy action based, at least in part, on a result of a comparison between an attribute of the first certificate and an attribute of the stored second certificate, wherein the result of the comparison includes a determination that a type of attribute of the first certificate includes content that is different than a content of a same type of attribute of the second certificate.

16. The computer system of claim 15, further comprising program instructions to execute the determined policy action on a client computing device.

17. The computer system of claim 15, wherein the program instructions to identify a first certificate that is used to establish a secure Internet connection, comprise program instructions to:

identify a certificate that is utilized to establish a secure Internet connection via deep-packet inspection; and storing the identified certificate in a storage device.

18. The computer system of claim 15, wherein the secure Internet connection is one or both of a cryptographic protocol, or an encryption protocol, wherein the one or both of the cryptographic protocol, or the encryption protocol, is one or more of a secure socket layer connection, or a transport layer security.

19. The computer system of claim 15, wherein the stored second certificate is located in a database that is at least in part managed by an in-line computing device.

20. The computer system of claim 15, wherein determining the policy action occurs after the secure Internet connection has been established.

* * * * *